(12) United States Patent
Traut et al.

(10) Patent No.: US 7,506,265 B1
(45) Date of Patent: Mar. 17, 2009

(54) SYSTEM AND METHOD FOR DISPLAYING IMAGES OF VIRTUAL MACHINE ENVIRONMENTS

(75) Inventors: Eric P. Traut, San Carlos, CA (US); Benjamin Martz, San Mateo, CA (US)

(73) Assignee: Microsoft Corporation, Redmond, WA (US)

(*) Notice: Subject to any disclaimer, the term of this patent is extended or adjusted under 35 U.S.C. 154(b) by 117 days.

(21) Appl. No.: 09/617,669

(22) Filed: Jul. 17, 2000

(51) Int. Cl.
  *G06F 3/048* (2006.01)
(52) U.S. Cl. .................. 715/763; 715/838
(58) Field of Classification Search .......... 365/700, 365/716, 719, 764, 781, 835, 838; 386/96, 386/98; 700/17; 709/203; 715/765, 835, 715/800, 810, 722, 718, 778, 736, 781, 744, 715/763, 838
See application file for complete search history.

(56) References Cited

U.S. PATENT DOCUMENTS

| | | | |
|---|---|---|---|
| 4,779,188 A | 10/1988 | Gum et al. ............. 364/200 |
| 4,875,186 A | 10/1989 | Blume, Jr. ............. 364/900 |
| 5,063,499 A | 11/1991 | Garber ................. 395/500 |
| 5,101,354 A * | 3/1992 | Mowers et al. ......... 700/92 |
| 5,278,973 A | 1/1994 | O'Brien et al. ........ 395/500 |
| 5,301,277 A | 4/1994 | Kanai ................... 709/301 |
| 5,367,628 A * | 11/1994 | Ote et al. .............. 345/501 |
| 5,406,644 A | 4/1995 | MacGregor ............ 395/500 |
| 5,448,264 A | 9/1995 | Pinedo et al. ........... 345/508 |
| 5,452,456 A | 9/1995 | Mourey et al. .......... 713/100 |
| 5,502,809 A | 3/1996 | Takano ................. 345/509 |
| 5,553,291 A | 9/1996 | Tanaka et al. .......... 395/700 |
| 5,617,552 A | 4/1997 | Garber et al. .......... 395/401 |
| 5,640,562 A | 6/1997 | Wold et al. ............ 395/652 |
| 5,666,521 A | 9/1997 | Marisetty ............... 345/525 |
| 5,673,403 A * | 9/1997 | Brown et al. ........... 345/744 |
| 5,675,382 A | 10/1997 | Bauchspies ............ 348/390 |
| 5,684,969 A * | 11/1997 | Ishida ................. 715/800 |
| 5,699,539 A | 12/1997 | Garber et al. .......... 395/402 |
| 5,727,135 A * | 3/1998 | Webb et al. ............ 358/1.14 |
| 5,729,471 A * | 3/1998 | Jain et al. ............. 725/131 |
| 5,734,865 A * | 3/1998 | Yu .................... 709/250 |

(Continued)

FOREIGN PATENT DOCUMENTS

EP  0 524 773 A1  7/1992

(Continued)

OTHER PUBLICATIONS

Nicoud et al., Video RAMs: Structure and Applications, 1988, IEEE, pp. 8-27.*

(Continued)

*Primary Examiner*—Weilun Lo
*Assistant Examiner*—Truc T Chuong
(74) *Attorney, Agent, or Firm*—Woodcock Washburn LLP

(57) ABSTRACT

A system and method for displaying thumbnail images of the video output of one or more software applications in a window or similar graphical interface to allow the user of a computer system to conveniently and quickly monitor the overall status and progress of several software applications that are running simultaneously. The thumbnail images are generated from the VRAM associated with the software application and are preferably displayed with information corresponding to the associated software application. The thumbnail images may be static or generated at regular intervals according to user preference and the status of the software application.

22 Claims, 4 Drawing Sheets

U.S. PATENT DOCUMENTS

| | | | | |
|---|---|---|---|---|
| 5,742,797 | A | 4/1998 | Celi, Jr. et al. | 345/507 |
| 5,752,275 | A | 5/1998 | Hammond | 711/207 |
| 5,757,386 | A | 5/1998 | Celi, Jr. et al. | 345/507 |
| 5,768,593 | A | 6/1998 | Walters et al. | 395/705 |
| 5,790,825 | A | 8/1998 | Traut | 712/209 |
| 5,815,686 | A | 9/1998 | Earl et al. | 395/500 |
| 5,831,607 | A | 11/1998 | Brooks | 345/333 |
| 5,850,471 | A * | 12/1998 | Brett | 382/162 |
| 5,860,147 | A | 1/1999 | Gochman et al. | 711/207 |
| 5,940,872 | A | 8/1999 | Hammond et al. | 711/207 |
| 5,999,173 | A * | 12/1999 | Ubillos | 345/724 |
| 6,008,847 | A | 12/1999 | Bachspies | 348/391 |
| 6,014,170 | A | 1/2000 | Pont et al. | 348/232 |
| 6,026,476 | A | 2/2000 | Rosen | 711/206 |
| 6,028,603 | A * | 2/2000 | Wang et al. | 345/776 |
| 6,031,529 | A * | 2/2000 | Migos et al. | 345/783 |
| 6,067,618 | A | 5/2000 | Weber | 713/1 |
| 6,075,938 | A | 6/2000 | Bugnion et al. | 395/500.48 |
| 6,115,054 | A | 9/2000 | Giles | 345/522 |
| 6,178,503 | B1 * | 1/2001 | Madden et al. | 713/2 |
| 6,496,206 | B1 * | 12/2002 | Mernyk et al. | 715/835 |
| 6,530,078 | B1 | 3/2003 | Shmid et al. | 717/138 |
| 6,724,403 | B1 * | 4/2004 | Santoro et al. | 715/765 |
| 6,727,920 | B1 * | 4/2004 | Vineyard et al. | 715/810 |
| 6,763,458 | B1 * | 7/2004 | Watanabe et al. | 713/100 |
| 7,124,374 | B1 * | 10/2006 | Haken | 715/859 |

FOREIGN PATENT DOCUMENTS

| | | |
|---|---|---|
| EP | 0 645 701 A2 | 9/1994 |
| WO | WO 98/57262 | 12/1998 |

OTHER PUBLICATIONS

Torrance et al., The Design of a Fully Integrated Graphic System, 1988, IEEE, pp. 368-376.*

Berry et al., "Innovative Graphical Interfaces Using Object Databases for Power System Analysis and Control", 1999, IEEE, pp. 200-205.*

NA 9206311, Multiple Bootable Operating System of IBM technical Disclosure Bulletin, Jun. 1, 1992, pp. 1-4.*

"Processor Instruction Sets," The PC Guide, version date Dec. 18, 2000, http://www.pcguide.com/ref/cpu/arch/int/inst-c.html.

"M68060 User's Manual," Motorola, 1994, pp. i-xviii; Section 4, Memory Management Unit, pp. 4-1 to 4-30, http://e-www.motorola.com/brdata/PDFDB/MICROPROCESSORS/32_BIT/68K-COLDFIRE/M680X0/MC68060UM.pdf.

"MPC750, RISC Microprocessor User's Manual," Motorola, Aug. 1997, Contents, pp. iii-xvi; Chapter 5, Memory Management, pp. 5-1 to 5-34; Glossary, pp. Glossary-1 to Glossary-13, http://e-www.motorola.com/brdata/PDFDB/MICROPROCESSORS/32_BIT/POWERPC/MPC7XX/MPC750UM.pdf.

PCT International Search Report in International Application No. PCT/US 01/22276, International filing date Jul. 16, 2001, mail date Jul. 3, 2002.

Traut E, "Building the Virtual PC," Byte, McGraw-Hill Inc., vol. 22, No. 11, pp. 51-52, Nov. 1, 1997.

"Intel386 DX Microprocessor," Intel, pp. 32-58, Dec. 31, 1995.

"MacIntosh and Technology: Changing Chips in the Middle of the Stream, or Apple Takes a RISC," URL:www.btech.co/changingchips.html, paragraphs '0006!-'0007!, retrieved Dec. 10, 2001.

"M68040 User's Manual," Motorola, Inc., Chapter 3, copyright 1990, revised 1992, 1993.

Osisek DL et al., "ESA/390 Interpretive-Execution Architecture, Foundation for VM/ESA," IBM Systems Journal, vol. 30, No. 1, pp. 34-51, 1991.

Shang Rong Tsai et al., On the Architectural Support for Logical Machine Systems, Microprocessing and Microprogramming, vol. 22, No. 2, pp. 81-96, Feb. 1988.

PCT International Search Report in International Application No. PCT?US 01/22277, International filing date Jul. 16, 2001, mail date Feb. 7, 2002.

* cited by examiner

SYSTEM AND METHOD FOR DISPLAYING IMAGES OF VIRTUAL MACHINE ENVIRONMENTS

TECHNICAL FIELD OF THE INVENTION

The present disclosure relates in general to the field of virtual machines, and, more particularly, to a system and method for displaying images from virtual machine environments.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680x0 processor family, manufactured by Motorola, Inc. of Phoenix, Ariz.; the Intel 80x86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will want to maximize its market share by having more rather than fewer applications run on the microprocessor family associated with the computer manufacturer's product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus, the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the host computer system exists only as a software representation of the operation of the hardware architecture of the guest computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system. The emulator program acts as the interchange between the hardware architecture of the host machine and the instructions transmitted by the software running within the emulated environment.

Over the years, the number of operating systems able to execute on a given processor family has increased markedly. For example, at present, the Windows operating system alone has several versions, such as Windows 3.1, Windows 95, Windows 98, Windows 98SE, Windows 2000, Windows NT, and Windows Millennium. Thus, a user of a computer system having an Intel 80X86 processor architecture may choose among several operating systems. Similarly, if the hardware architecture of a computer system running an Intel 80X86 architecture is being emulated in a host computer system, it may be desirable to run several virtual machines simultaneously, with each virtual machine operating according to a different operating system. As an example, it may be desirable to emulate on a Macintosh computer system several guest computers systems, each running a separate version of Windows. By doing so, the Macintosh user can take advantage of the wide variety of software applications designed to run on PC computer systems.

As the user increases the number of software applications and operating systems that is running on a computer system, it becomes more difficult for the user to manage the various tasks performed on the computer system. Accordingly, as the user increases the number of virtual machines running on the computer system, it becomes more difficult for the user to keep track of both the virtual machines and the respective applications running on the computer system's native operating system and the various virtual machines. For example, in operating systems that use windowing environments, such as Windows, the Macintosh operating system, and OS/2, for example, users may resize or move windows that correspond to various applications. Windows that are minimized or suspended are typically moved to a task bar, application bar or application list where they can be later accessed. Unfortunately, these application bars or lists generally do not present the user with enough information about the particular applications contained therein to allow the user to quickly find the particular application the user is interested in resuming. This problem is exacerbated as the number of applications and corresponding windows increases.

SUMMARY OF THE INVENTION

In accordance with teachings of the present disclosure, a system and method for managing multiple virtual computer environments are disclosed that provide significant advantages over prior developed systems.

The system and method described herein allow a user of a host computer system running multiple virtual machine environments to view the thumbnail images of the video output of each virtual machine application. According to one embodiment of the present invention, the thumbnail images are generated by interpreting the contents of the virtual machine's video RAM (VRAM) and scaling the resulting representations into several thumbnail images that may be conveniently viewed, for example, in a single window. Interpretation of the virtual machine's VRAM is generally dependent on the current video mode of the virtual machine, such as text, planar video, linear video, among other examples. According to one embodiment of the present invention, the thumbnail images are generated using bilinear sampling techniques to create an anti-aliased miniature image. In the case of active emulated computer systems, thumbnail images are preferably continuously generated to give a real-time representation of the virtual machine application within the thumbnail view. The thumbnail or reduced-size images are preferably saved whenever the respective virtual machine is placed in a suspension mode and accordingly saved to the storage device of the computer system running the virtual machine software. The image of these suspended images are likewise displayed for the user, allowing the user to quickly view the status of the virtual machine regardless of whether the virtual machine is active or suspended.

The disclosed system and method provide several technical advantages over conventional systems and methods for managing multiple computer applications, such as multiple virtual computer environments. One advantage of the system and method of the present invention is that it allows a user of a computer system that is running multiple virtual machine environments to view the status of several multiple virtual machine environments at one glance. This allows the user to easily manage several virtual machine environments that are running simultaneously. Another advantage of the present system and method is that the user may quickly ascertain the status of a given virtual machine without having to activate or unsuspend the virtual machine. This allows the user to save time, especially if the virtual machine is running at a relatively slow speed, or if the user is working on several projects.

Other technical advantages should be apparent to one of ordinary skill in the art in view of the specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
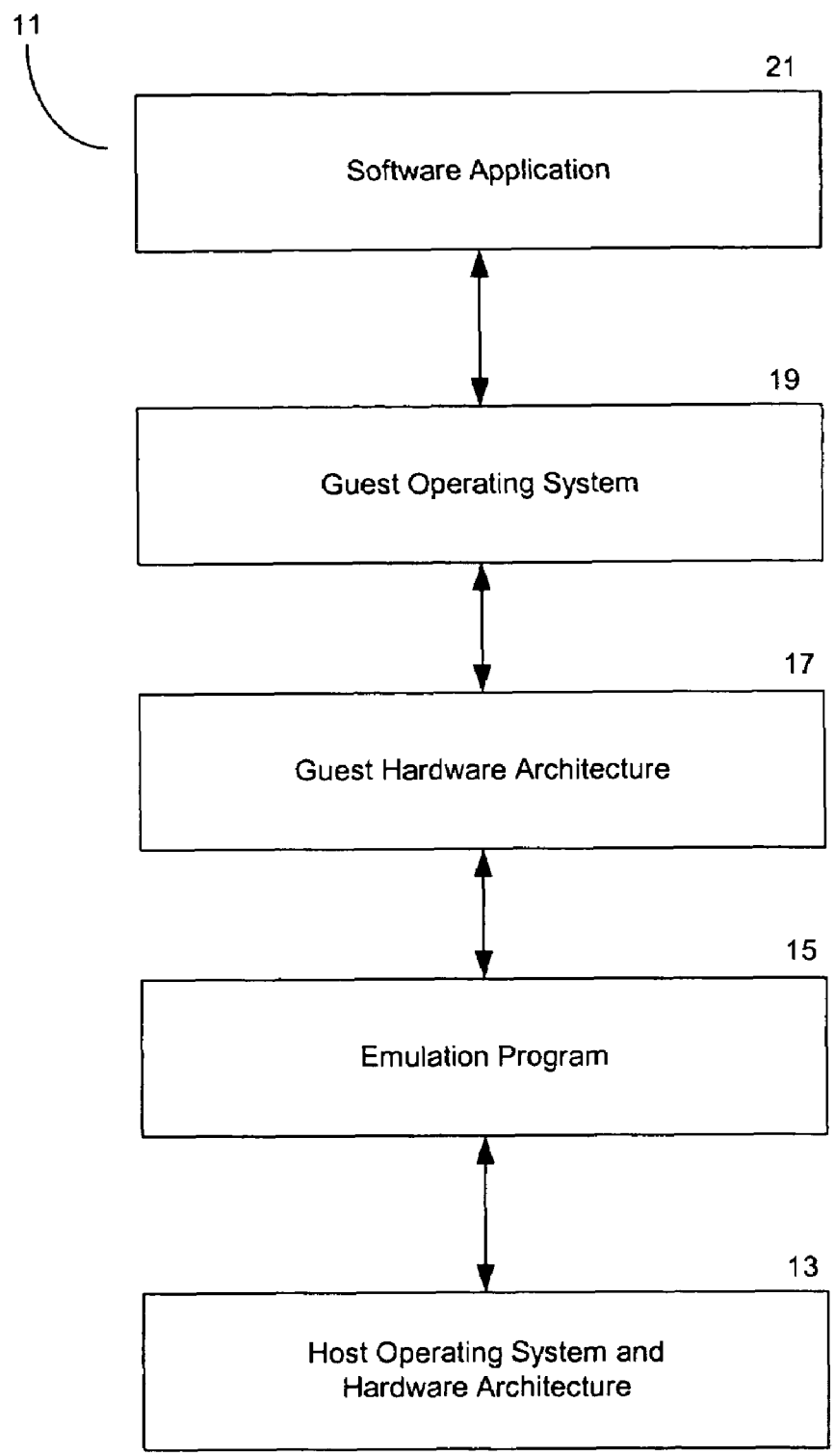
FIG. 1 is a diagram of the logical relationship of the elements of an emulated computer system running in a host computer system.

Shown in FIG. 1 is a diagram of the logical layers of the hardware and software architecture for an emulated operating environment in a computer system 11. An emulation program 15 runs on a host operating system and/or hardware architecture 13. Emulation program 15 emulates a guest hardware architecture 16 and a guest operating system 19. Software application 21 in turn runs on guest operating system 19. In the emulated operating environment of FIG. 1, because of the operation of emulation program 15, software application 21 can run on the computer system 11 even though software application 21 is designed to run on an operating system that is generally incompatible with the host operating system and hardware architecture 13.

Figure 2:
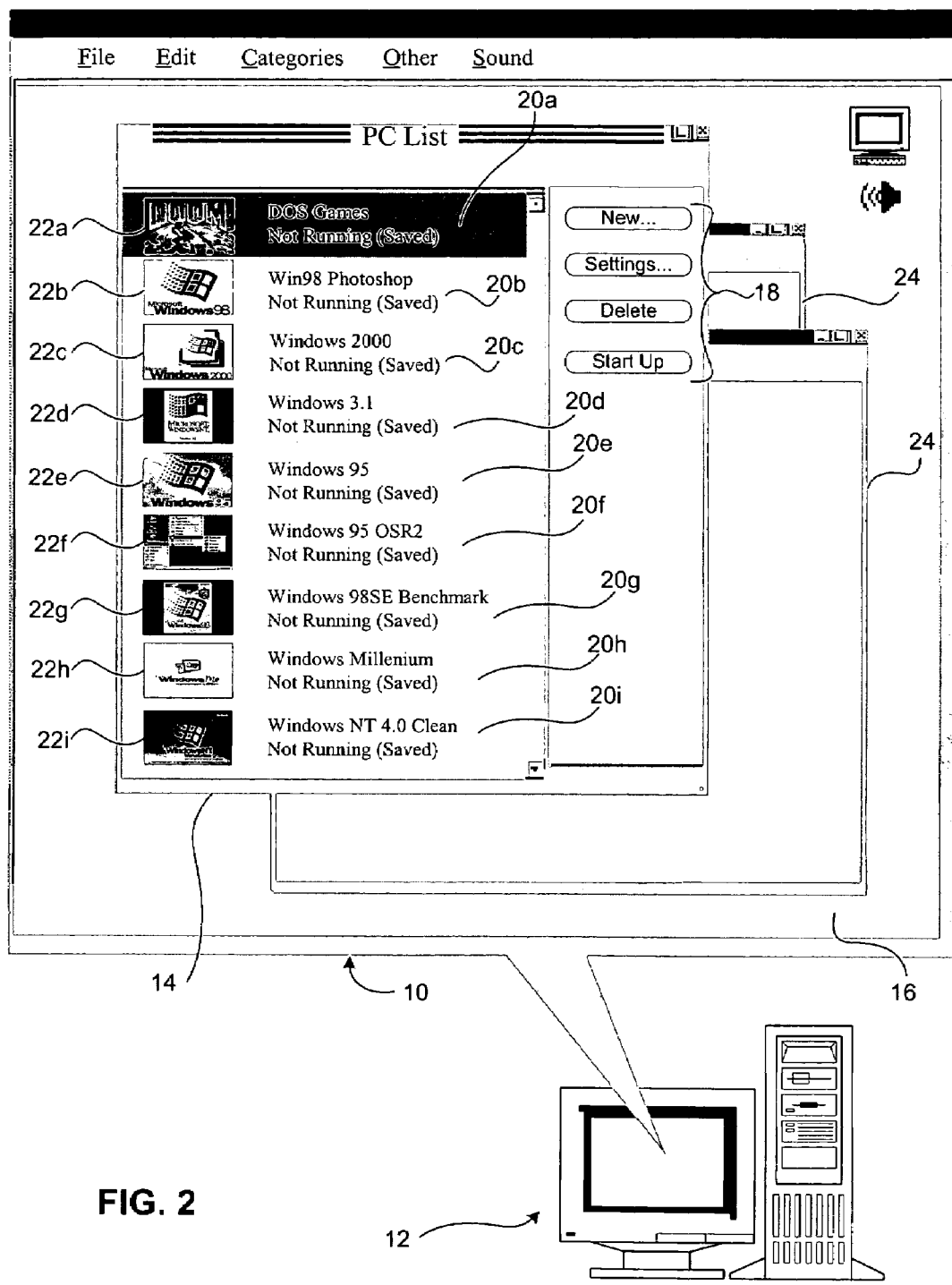
FIG. 2 is diagram depicting the screen display from a computer system utilizing an embodiment of the present invention.

Shown in FIG. 2 is a screen display 10 from a computer system 12 that implements the system and method of the present invention. Computer system 12 may use any type of processor and any type of operating system that are suitable for running one or more virtual machines. For example, computer system 12 may include a processor from one of several processor families such as the PowerPC processor, the Intel 80X86 Pentium processor, or the Motorola 680X0 processor, among other examples. The operating system of computer system 12 is preferably an operating system that may use a windowing environment. Examples of suitable operating systems include Windows, the Macintosh OS, or OS/2, among other examples. For example, the computer system 12 depicted in FIG. 2 uses the Macintosh OS and a PowerPC processor.

Computer system 12 is running one or more virtual machines or emulators on its native or host operating system. As discussed above, an emulator or virtual machine allows a host computer to run a software application that is designed for an operating system or processor that is not native to the host computer. Thus, computer system 12 is a host computer system. If the native operating system for computer system 12 uses a windowing environment or other similar graphical user interface that represents programs, files, and options by means of icons, menus, and dialog boxes on the screen, then the virtual machines or emulators may be displayed in a virtual machine list window 14 that can be displayed on the desktop 16 of the operating system of computer system 12. From the virtual machine list window 14, the user of the computer system may monitor or modify the function of the virtual machines or emulators running on computer system 12. The user may modify the function of the virtual machines or emulators using control buttons 18 or any similar graphical interface functionality. For example, the user may choose additional virtual machines or emulators to run, choose new software applications to run on virtual machines or emulators that are already running, modify the settings associated with any of the virtual machines or emulators, terminate any of the virtual machines or emulators, or suspend any of the virtual machines or emulators, among other examples.

One or more virtual machine status windows are displayed within virtual machine list window 14. Shown in list window 14 are virtual machine status windows 20a-20i. Each virtual machine status window is preferably associated with one of the virtual machines running on computer system 12. Alternatively, if a particular virtual machine is running more than one software application, then a virtual machine status window can be associated with each software application. Each virtual machine status window displays information regarding the associated virtual machine or emulator. For example, the virtual machine status window may display information regarding the operating system or computer system that is being emulated, the software application that is running under the associated virtual machine or emulator, and the current status of the software application, among other examples.

In addition, each virtual machine status window also contains a thumbnail image. Shown in list window are thumbnail images 22a-22i, each of which is associated with a virtual machine status window 20a-20i. Each thumbnail image is a representation of the image or graphical output that is currently being generated by the software application or operating system running under the virtual machine associated with the respective virtual machine status window. If the software application is currently suspended or saved, then the associated thumbnail image is the image that was saved in VRAM of the virtual machine at the time that the virtual machine environment was suspended. Each thumbnail image is preferably sized to allow the user to conveniently view all or several of the virtual machine status windows 20 on the computer screen of computer system 12. If the operating system of the virtual machines displays images in color, then thumbnail image is preferably also displayed in color. As discussed below, thumbnail image may be a static image or an image that is updated in real-time or periodically.

The computer system 12 illustrated in FIG. 2 is using the Macintosh OS and is running through an emulator program several virtual PC machines on the host Macintosh OS. The virtual machine status windows 20a-20i in FIG. 2 display information associated with the various virtual PC machines that are operating on computer system 12. Virtual machine status window 20a indicates that computer system 12 includes a virtual machine that is emulating a computer system with a DOS operating system. Virtual machine status window 20a also indicates that the operation of a video game software application is associated with this virtual machine. In addition, virtual machine status window 20a indicates that the operation of this video game is currently saved or suspended. Because the software application is suspended, thumbnail image 22a is a representation of the image that was in VRAM of the virtual machine at the time that the virtual machine was suspended. Similarly, virtual machine status windows 20b through 20i indicate that computer system 12 also includes virtual machines that emulate computer systems running Windows 98, Windows 2000, Windows 3.1, Windows 95, Windows 98SE, Windows Millennium, and Windows NT operating systems. Thumbnail images 20b through 20i are representations of the images that were created by the operating systems or software applications associated with virtual machine status windows 20b through 20i. The term Windows is a trademark of Microsoft Corporation.

Generally, each software application running on an operating system implementing a windowing environment will be running in its own window. Therefore, the other active software applications of the computer system 12 will be running in one of windows 24. Preferably, the user does not operate the software application depicted in the virtual machine list window 14 directly from the virtual machine list window 14. Thus, if software application depicted in virtual machine list 14 is running, it will be running on an active window 24 in addition to being depicted in virtual machine window list 14.

However, the user may preferably be able to restore or maximize the window 24 associated with a software application running under a virtual machine or emulator application by clicking on, or otherwise activating, the virtual machine status window 22 associated with that software application and the corresponding virtual machine or emulator.

Figure 3:
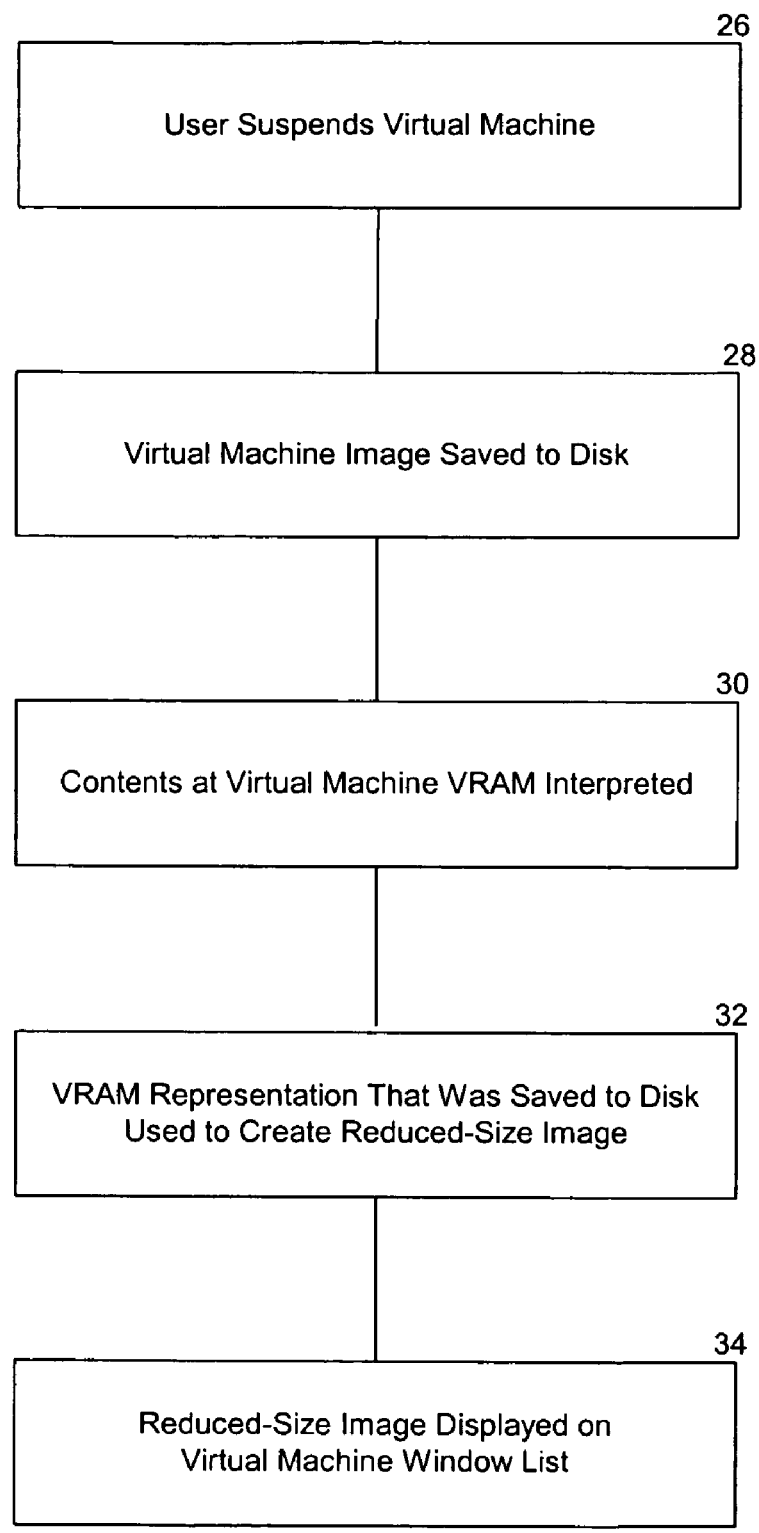
FIG. 3 is a flow diagram of method for displaying a thumbnail image of an emulated computer system.

FIG. 3 depicts a process diagram for suspending the contents of a virtual machine and later displaying those contents in a reduced-size representation for the user. As discussed above, the user of computer system 12 may have several virtual machines or emulated operating system environments running at the same time. Due to resource limitations, a computer system 12 running several virtual machine applications simultaneously may incur adverse performance effects. Therefore, it may be desirable for a user of computer 12, to suspend a particular virtual machine or operating system environment. At step 26 of FIG. 3, the user of computer system 12 suspends a virtual machine application. By temporarily halting the virtual machine, the user can conserve resources and improve the management or performance of other applications. When a virtual machine application is suspended, the operating parameters associated with the virtual machine are stored, so that the operation of the virtual machine can be quickly resumed if the user of computer system 12 decides to activate or unsuspend the virtual machine. Thus at step 28, the contents of the RAM, VRAM, registers, parameters and other data associated with the virtual machine application are saved to a storage device of computer system 12. Typically, the storage device will be a hard drive, disk, or some other nonvolatile storage medium. For instance, if the virtual machine is emulating a processor, network card and video card of a particular hardware architecture, then the registers for these various components must be saved to memory as part of the suspension process. Saving the contents of VRAM of the virtual machine saves the video image most recently displayed by the virtual machine. Similarly, various parameters for these components must be saved, such as the video mode and resolution for the video card, for example. The step of saving the virtual machine environment to a storage device is preferably performed with a compression algorithm or similar functionality to reduce the storage space or time required for this step.

To successfully manage a computer system 12 with several virtual machines, the user must be able to quickly ascertain the status of each virtual machine, such as whether the virtual machine is running a software application, and whether the virtual machine is active or suspended. In the case of suspended virtual machines, after the suspended virtual machine environment has been saved to the storage device, the thumbnail image 22 and other information must be generated for the virtual machine status window 20. To generate thumbnail image 22, the contents of the virtual machine's VRAM, which have been stored to memory, must be interpreted at step 30. Interpreting the virtual machine's VRAM involves taking into account the video mode or video adapter setting of the virtual machine at the time it was suspended. The video mode is the manner in which the virtual machine's video adapter displays on-screen images to the monitor of computer system 12. The most common video modes are text mode and graphics mode. In text mode, only characters such as letters, numbers, and symbols may be displayed, and these characters are not drawn as pixel representations. On the other hand, graphics mode produces all monitor images, whether text or art, as patterns of pixels. Examples of graphics modes include planar video and linear video, among other examples. Another consideration for interpreting the VRAM is the associated bit depth or color depth. Because color in a computer image is a function of the number of bits available to provide different shades for each pixel, bit depth is a measure of the number of different colors that may be displayed in the image. Other graphical settings and parameters may need to be processed or taken in account as well. In the case of active virtual machines, the contents of the VRAM for active virtual machines is saved in the main memory of the host system. To display a reduced-size image of the active virtual machine, the contents of the main memory of the host system must be likewise interpreted.

With reference to FIG. 3, once the contents of the virtual VRAM have been interpreted, the resulting representation is used to create thumbnail image 22 at step 32. At this point, the contents of the virtual VRAM have been saved to disk, and this saved image from disk is the image that is used to create the thumbnail image 22. Generally thumbnail images 22 are preferably created using bilinear sampling techniques to create an anti-aliased miniature image. Anti-aliasing, or over-sampling, is a graphics technique that smoothes out the jagged appearance of curved or diagonal lines, a phenomenon known as "jaggies." Examples of anti-aliasing techniques include surrounding selected pixels in the image with intermediate shades and manipulating the size and alignment of the pixels. An anti-aliased image is preferred because the thumbnail image 22 is preferably small and the presence of jaggies or other visual distortions will typically result in a poor image. A bilinear sampling technique is used to down-sample the source image on the VRAM by averaging the pixels in the source image to create a scaled-down thumbnail image 22. Another technique that may be used to create thumbnail image 22 is spot or point sampling to map a pixel in the source image to a pixel in the thumbnail image 22. Unfortunately, point sampling tends to result in a significant loss of data. Other techniques suitable for creating a scaled-down image may be used, such as area sampling and gaussian filtering, among other examples. The thumbnail image 22 is then displayed in the virtual machine list window 14 at step 34. Preferably, thumbnail image 22 is saved to the storage device along with the virtual machine that is suspended so that the thumbnail image 22 may be quickly displayed at a later time, as the image does not need to be created again from the VRAM.

In the case of active virtual machines, a user of computer system 12 may wish to keep several virtual machine applications active and monitor their overall performance from time to time while directly operating the virtual machine application the user has chosen as a primary action item. For example, the user of computer system 12 may be running a virtual machine that is running a word processor software application for the purposes of creating a document and at least one other virtual machine that is running computer-aided design software applications (CAD). While the process of creating a document requires continuous user input to the word processor software application, the CAD applications do not necessarily require continuous user input if, for example, the CAD applications are rendering wire-frame skeleton models. However, the user may be interested in monitoring the progress of the CAD applications from time to time, but preferably only at a cursory level, as the user is only interested in gaining an overall impression of the rendering job before returning his attention to the word processor application. Therefore, the technique of the present invention allows the user, in the case of active virtual machines, to monitor a thumbnail image of the active virtual machines on a real time basis.

Figure 4:
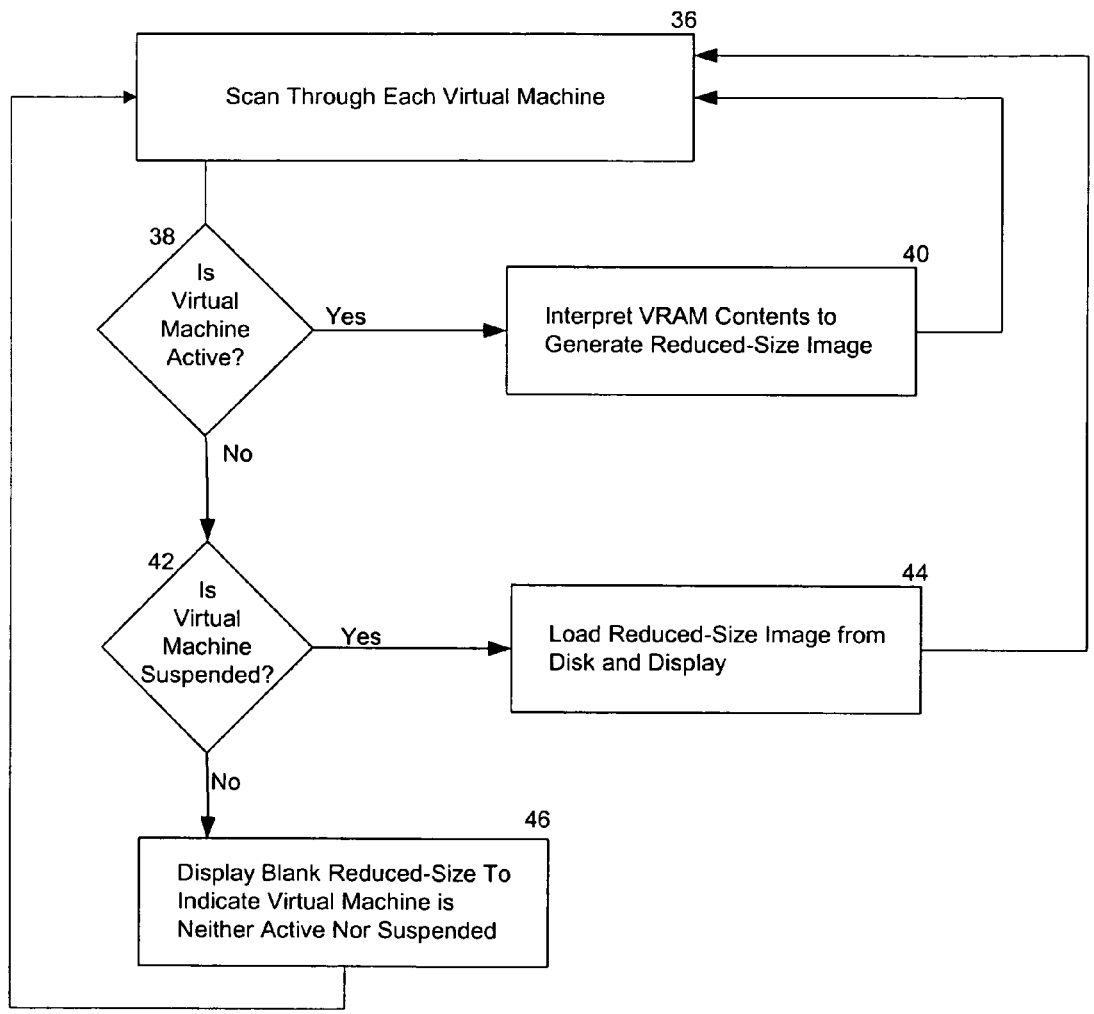
FIG. 4 is a flow diagram of the manner in which an emulator program polls each virtual machine environment to determine that status of the virtual machine.

Shown in FIG. 4 is a flow diagram of the manner in which the emulator program polls each virtual machine environment to determine the status of the virtual machine and to locate the reduced-size image to be displayed for each virtual machine. At step 36, the emulator routine scans through each emulated system. For each system, the emulator program performs the decision of step 38 and then steps through the remainder of the flow diagram of FIG. 4. If the virtual machine is determined to be active at step 38, then at step 40 a reduced-size image of the VRAM of the virtual machine is interpreted by the emulator program and displayed for the user. In the case of active emulated systems, the contents of their VRAM are maintained by the host system in the main memory of the host system. If it is determined at step 38, that the virtual machine is not active, processing continues at step 42, where it is determined whether the virtual machine has been suspended, i.e., whether the image contents of the virtual machine have been saved to disk. If the image contents of the virtual machine have been suspended to disk, the emulator program at step 44 loads from disk and displays a thumbnail image of the image of the virtual machine at the time of its suspension. If it is determined at step 42 that the virtual machine is not suspended, then at step 46 a blank reduced-size image is loaded and displayed for the user. After each of steps 40, 42, or 46, the processing continues at step 36 with a scan of each virtual machine. The processing steps of FIG. 4 permit the emulator program to continually monitor the status of each virtual machine. If a virtual machine transitions from suspended mode to active mode, for example, the emulator program is able to monitor this transition and display the correct image of the virtual machine. Additionally, for those virtual machines that are active, the processing steps of FIG. 4 permit the emulator to display for the user a continually updated rendering of the image of the active virtual machine. The processing steps of FIG. 4 may occur roughly once per second. At this processing rate, a continually update image of each active machine is displayed for the user to permit the user to monitor the state of each active virtual machine.

Although the disclosed embodiments have been discussed in reference to the field of virtual machines and emulators, it can be readily appreciated that the present invention has equal applicability to other types of software applications. For example, the user of computer system 12 may be running several software applications simultaneously and would like to monitor the status of all of the applications in a convenient manner. The virtual machine list window 14 could alternatively display all of the software applications that are currently active or otherwise on the desktop 16. Each software application would be associated with a virtual machine status window 20 that would provide information on the software application and its status. A thumbnail image 22 would be generated for each virtual machine status window 20 that would represent the video or graphical output of the software application. As discussed above, the thumbnail image 22 could be static or continuously updated depending on the user's preference and the status of the associated software application.

It should be noted that the choice of computer system that can be emulated according to the technique of the present invention is not limited to computers systems that operate according to the Intel 80X86 system architecture and run a Windows operating system. The invention described herein applies to any emulated environment in which one or more virtual machines can be displayed in a windowed setting. Thus, the invention disclosed herein can be used in any environment in which the contents of the virtual video memory buffer may be displayed for the user. The method disclosed herein is especially advantageous in that it permits a user to monitor the activities or suspended state of one or more virtual machine environments. Thus, the user, when operating in a first virtual machine environment can readily determine the operating state or suspended condition of one or more other virtual machine environments that typically comprise unique operating system environments. The reduced-size representations of the virtual machine environments are rendered on the basis of the contents of the saved virtual VRAM of each environment. Thus, from a location in main memory, the emulator program can create for the user an easily accessible visual directory of the other virtual machine environments being emulated by the host system.

Although the disclosed embodiments have been described in detail, it should be understood that various changes, substitutions, and alterations can be made to the embodiments without departing from their spirited scope.

What is claimed is:

1. A single computer system for running one or more software applications comprising:
   a processor;
   a computer readable storage medium including instructions executable by the processor, the computer readable storage medium comprising:
      instructions for a host operating system suitable for displaying a graphical user interface;
      instructions for multiple guest operating systems configured to execute on the single computer system in virtual machines emulated by one or more emulator programs running on the host operating system; and
      wherein the host operating system is configured to display a reduced-size continually updated representation of the video output of at least one operating system from the multiple guest operating systems that are being operated in a background mode;
      wherein the multiple guest operating systems that operate in a background mode are active;
      wherein video output of the multiple guest operating systems is stored in one or more virtual video memory components;
      wherein the reduced-size continually updating representation of the video output from at least one guest operating system is represented as at least one thumbnail image, the at least one thumbnail image is generated from the video output stored in the video memory components, and the at least one thumbnail image is generated at predetermined intervals while software applications are active; and
      wherein the predetermined intervals are such that the at least one thumbnail image is a real-time representation of the video output from the active software applications.

2. The computer system of claim 1, wherein the one or more of the video memory components are VRAM memory.

3. The computer system of claim 1,
   wherein the graphical user interface is a windowing environment suitable for displaying one or more windows; and
   wherein the portion of the graphical user interface comprising the reduced-size representation is a window.

4. The computer system of claim 1, wherein the reduced-size representation is created using a bilinear sampling technique.

5. A single computer system for running one or more software applications, wherein the software applications are suitable for generating a video output, the computer system comprising:
   a host operating system suitable for displaying a graphical user interface;
   multiple emulated virtual machines, containing respective guest operating systems running on the single computer system, being emulated by one or more emulator programs running on the host operating system;
   a virtual video memory component configured to store video output of the guest operating systems;
      wherein guest operating systems that operate in background mode are active;
      wherein the host operating system is able to display for a user reduced-size continually updated representation of the video output of each virtual machine as thumbnail images, the thumbnail images generated from the video output stored in the video memory component, and the thumbnail images are generated at predetermined intervals while software applications are active; and
      wherein the predetermined intervals are such that the thumbnail images are real-time representations of the video output from the active software applications.

6. A method for displaying reduced-size images of multiple virtual machines comprising:
   providing a plurality of virtual machines and respective guest operating systems on a host computer that is a single computer, each virtual machine comprising a virtualized computer environment hosting a corresponding one of the guest operating systems on the host computer, where the operating systems hosted on the virtual machines are executing concurrently on the same host computer;
   suspending one or more of the virtual machines, and saving to memory in a host computer system the image of each of the suspended virtual machines, wherein each suspended virtual machine includes a virtual video adaptor;
   reading in at an emulator program from memory in the host computer system the images of the suspended virtual machines;
   interpreting in the emulator program the contents of saved images of the suspended virtual machines based on video adaptor settings of the virtual video adaptors; and
   displaying representations of the suspended virtual machines as thumbnail images the thumbnail images continually updated at predetermined intervals.

7. A method for displaying reduced-size images of virtual machines comprising:
   providing a plurality of virtual machines and respective guest operating systems on a host computer that is a single computer, each virtual machine comprising a virtualized computer environment hosting a corresponding one of the guest operating systems on the host computer, where the operating systems hosted on the virtual machines are executing concurrently on the same host computer;
   reading in from virtual video memory configured to store images of the virtual machines each virtual machine having a virtual video adaptor;
   wherein guest operating systems that operate in background mode are active;
      interpreting in the emulator program the contents of the images of the virtual machines based on video adaptor settings of the virtual video adaptors;
      displaying reduced-size continually updated representations of the virtual machines, as thumbnail images, the thumbnail images generated from the images stored in the virtual video memory, and the thumbnail images are generated at predetermined intervals while software applications are active; and wherein the predetermined intervals are such that the thumbnail images are real-time representations of the video output from the active software applications.

8. The method of claim 7 wherein the step of displaying reduced-size representations of the virtual machines are performed on a computer system comprising:
the host operating system suitable for displaying a graphical user interface.

9. The method of claim 7 wherein one or more of the virtual video memory is VRAM.

10. A method of displaying images on a display coupled with a host computer, the method comprising:
providing a plurality of virtual machines and respective guest operating systems on the host computer that is a single computer, each virtual machine comprising a virtualized computer environment hosting a corresponding one of the guest operating systems on the host computer, each virtualized computer environment having a virtual video adaptor, where the operating systems hosted on the virtual machines are executing concurrently on the same host computer;
storing video output from the virtual video adaptors in virtual video memory components; interpreting the video output from the virtual video adaptors based on video adaptor settings of the virtual video adaptors;
displaying a screen associated with a host operating system on the display together with thumbnail images generated from the interpreted video output from the virtual video adaptors, the thumbnail images are generated at predetermined intervals while software applications are active;
wherein the predetermined intervals are such that the thumbnail images are real-time representations of the video output from the active software applications; and
wherein the multiple guest operating systems that operate in a background mode are active.

11. The method according to claim 10, wherein the thumbnail images are based on image data from video RAMs of the virtual machines.

12. A method of displaying an image on a display coupled with a host computer, the method comprising:
providing a first virtual machine running a first guest operating system, the first virtual machine having a first virtual video adaptor, and a second virtual machine running a second guest operating system, the second virtual machine having a second virtual video adaptor, wherein both guest operating systems are configured for concurrent execution on the host computer that is a single computer;
storing video output from the first and second video adaptors in virtual video memory components;
interpreting the video output from the first virtual video adaptor based on video adaptor settings of the first virtual video adaptor and interpreting the video output from the second virtual video adaptor based on video adaptor settings of the second virtual video adaptor;
generating a first and second thumbnail based on the interpreted video output from the first and second virtual video adaptors, wherein the thumbnail images are generated at predetermined intervals while software applications are active; and
concurrently displaying, on the display, the first thumbnail of image output and the second thumbnail of image output, wherein the predetermined intervals are such that the thumbnail images are real-time representations of the video output from the active software applications; and wherein guest operating systems that operate in a background mode are active.

13. The method according to claim 12, wherein first thumbnail is derived from video RAM of the first virtual machine, and the second thumbnail is derived from video RAM of the second virtual machine.

14. The method according to claim 12, further comprising allowing a user to interact with the thumbnails to control the virtual machines.

15. The method according to claim 12, wherein displaying of the thumbnails is accomplished by accessing video RAMs of the virtual machines.

16. The method according to claim 12, wherein the thumbnail images comprise reduced versions of images generated for display by the virtual machines.

17. The method according to claim 12, wherein the thumbnails reflect the video outputs of the virtual machines in real time.

18. A method comprising:
providing a plurality of virtual machines and respective guest operating systems on a host computer that is a single computer, each virtual machine comprising a ritualized computer environment hosting a corresponding one of the guest operating systems on the host computer, the virtual machines each comprising a virtual video adaptor having a video RAM where the operating systems hosted on the virtual machines are executing concurrently on the same host computer;
storing images from the video RAM in main memory of the computer;
accessing the video RAMs of the virtual machines to obtain images from the video RAMS;
generating thumbnail images of the images obtained from the video RAMs based on video adaptor settings of the virtual video adaptors, wherein the thumbnail images are generated at predetermined intervals while software applications are active; and
concurrently displaying the thumbnail images that are continually updated, wherein the predetermined intervals are such that the thumbnail images are real-time representations of the video output from the active software applications; and
wherein the guest operating systems that operate in a background mode are active.

19. The method according to claim 18, the method further comprising:
determining display modes corresponding to, respectively, the video RAMs of the virtual machines; and
generating the thumbnail images in accordance with the display modes.

20. The method according to claim 18, wherein the thumbnail images are displayed to reflect the video RAMs in real time.

21. A method, comprising:
providing a plurality of virtual machines and respective guest operating systems on a host computer that is a single computer, each virtual machine comprising a virtualized computer environment hosting a corresponding one of the guest operating systems on the host computer, each virtual machine having a virtual video adaptor, where the operating systems hosted on the virtual machines are executing concurrently on the same host computer;

storing image data received from the virtual video adaptors in virtual video memory components;

interpreting the image data received from the virtual video adaptors based on video adaptor settings of the virtual video adaptors;

displaying thumbnail images generated from the image data, wherein the thumbnail images are generated at predetermined intervals while software applications are active;

wherein the predetermined intervals are such that the thumbnail images are real-time representations of the video output from the active software applications; and wherein the guest operating systems that operate in a background mode are active.

22. The method according to claim 21, wherein the displaying further comprises displaying the images in a graphical user interface that can be interacted with by a user to control execution of the virtual machines.

* * * * *